United States Patent
Kurata et al.

(10) Patent No.: US 8,156,184 B2
(45) Date of Patent: Apr. 10, 2012

(54) DIALOG SERVER FOR HANDLING CONVERSATION IN VIRTUAL SPACE METHOD AND COMPUTER PROGRAM FOR HAVING CONVERSATION IN VIRTUAL SPACE

(75) Inventors: Gakuto Kurata, Yamato (JP); Tohru Nagano, Yokohama (JP); Michiaki Tatsubori, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 311 days.

(21) Appl. No.: 12/389,073

(22) Filed: Feb. 19, 2009

(65) Prior Publication Data
US 2009/0210804 A1    Aug. 20, 2009

(30) Foreign Application Priority Data
Feb. 20, 2008  (JP) .................. 2008-38422

(51) Int. Cl.
G06F 15/16 (2006.01)
(52) U.S. Cl. ........ 709/204; 709/203; 707/771; 715/706; 715/708
(58) Field of Classification Search .................. 709/204, 709/206, 203, 205; 715/706, 753, 757, 758; 345/666, 419, 706, 757, 848; 704/269
See application file for complete search history.

(56) References Cited

U.S. PATENT DOCUMENTS

| | | | |
|---|---|---|---|
| 6,329,986 B1 * | 12/2001 | Cheng .......................... | 345/419 |
| 6,772,195 B1 * | 8/2004 | Hatlelid et al. ................ | 709/204 |
| 7,086,005 B1 * | 8/2006 | Matsuda ....................... | 715/706 |
| 7,155,680 B2 * | 12/2006 | Akazawa et al. ............. | 715/757 |
| 7,346,654 B1 * | 3/2008 | Weiss ............................ | 709/204 |
| 7,386,799 B1 * | 6/2008 | Clanton et al. ............... | 715/758 |
| 2001/0044725 A1 * | 11/2001 | Matsuda et al. .............. | 704/269 |

(Continued)

FOREIGN PATENT DOCUMENTS
JE    10-079929    3/1998
(Continued)

OTHER PUBLICATIONS

Steve Benford et al9. 1993. A spatial model of interaction in large virtual environments. In Proceedings of the third conference on European Conference on Computer-Supported Cooperative Work (ECSCW'93),Kluwer Academic Publishers, Norwell, MA, USA, 109-124.*

(Continued)

*Primary Examiner* — Kevin Bates
*Assistant Examiner* — Michael Martinez
(74) *Attorney, Agent, or Firm* — Gail H. Zarick; Otterstedt, Ellenbogen & Kammer, LLP

(57) ABSTRACT

A dialog server which provides dialogs made by at least one user through their respective avatars in a virtual space. A method and a computer readable article of manufacture tangibly embodying computer readable instructions for executing the steps of the method are also provided. The dialog server includes: a position storage unit which stores positional information on the avatars; an utterance receiver which receives at least one utterance of avatars and utterance strength representing an importance or attention level of the utterance; an interest level calculator which calculates interest levels between avatars based on their positional information; a message processor which generates a message based on the utterance in accordance with a value calculated from the interest levels and the utterance strength; and a message transmitter which transmits the message to the avatars.

24 Claims, 17 Drawing Sheets

U.S. PATENT DOCUMENTS

| | | | |
|---|---|---|---|
| 2008/0215995 A1* | 9/2008 | Wolf | 715/758 |
| 2009/0013263 A1* | 1/2009 | Fortnow et al. | 715/753 |
| 2009/0141047 A1* | 6/2009 | Bates et al. | 345/666 |
| 2009/0300521 A1* | 12/2009 | Jerrard-Dunne et al. | 715/757 |
| 2010/0077034 A1* | 3/2010 | Alkov et al. | 709/206 |
| 2010/0205541 A1* | 8/2010 | Rapaport et al. | 715/753 |

FOREIGN PATENT DOCUMENTS

| | | |
|---|---|---|
| JP | 09-006985 | 1/1997 |
| JP | 2001-228794 | 8/2001 |
| JP | 2004-267433 | 9/2004 |
| JP | 2005-322125 | 11/2005 |
| JP | 2007-072511 | 3/2007 |

OTHER PUBLICATIONS

Kurabayashi, N.; Yamazaki, T.; Hasuke, K.; Yuasa, T.; , "Zinger: conversation support based on interest similarity," Multimedia and Expo, 2001. ICME 2001. IEEE International Conference on , vol., no., pp. 435-438, Aug. 22-25, 2001.*

* cited by examiner (1)

(2) A'S VIEW (3) B'S VIEW (4) Ch'S VIEW (5)

|    | Ch  | A   | B   |
|----|-----|-----|-----|
| Ch |     | 0.5 | 0.5 |
| A  | 0.5 |     | 0.5 |
| B  | 0.5 | 0.5 |     |

(1)

(2) A'S VIEW

(3) B'S VIEW

(4) Ch'S VIEW

(5)

|    | Ch  | A   | B   |
|----|-----|-----|-----|
| Ch |     | 0.5 | 0.5 |
| A  | 0.8 |     | 0.2 |
| B  | 0.8 | 0.2 |     |

(1)

(2) Ch'S VIEW (3) C'S VIEW (4) F'S VIEW (1)

(2)
Ch'S VIEW

(3)
C'S VIEW

(4)
F'S VIEW

(1)

(2) Ch'S VIEW (3) C'S VIEW (4) F'S VIEW (1)

(2) Ch'S VIEW (3) C'S VIEW (4) F'S VIEW (1)

(2)
Ch'S VIEW (3)
C'S VIEW (4)
F'S VIEW (1)

(2) Ch'S VIEW (3) C'S VIEW (4) F'S VIEW

DIALOG SERVER FOR HANDLING CONVERSATION IN VIRTUAL SPACE METHOD AND COMPUTER PROGRAM FOR HAVING CONVERSATION IN VIRTUAL SPACE

CROSS-REFERENCE TO RELATED APPLICATION

This application claims priority under 35 U.S.C. §119 from Japanese Patent Application No. 2008-38422 filed Feb. 20, 2008, the entire contents of which are incorporated herein by reference.

BACKGROUND OF THE INVENTION

1. Field of the Invention

The present invention relates to a dialog server providing dialogs between users and more particularly, it relates to a method and a computer program for having a conversation in a virtual space.

2. Description of Related Art

Previously, services allowing multiple users to exchange messages and thereby to have a conversation have been provided. Such services include a video conference service utilizing text chat, images and audio. Recently, it is being realized that a large number of users have a conversation in a virtual space. Since each user has been able to exchange messages with a large number of other users, it is necessary to connect each of these other users with his/her messages so that each user can distinguish messages of one user from those of another.

Japanese Patent Application Publication No. 2004-267433 (hereinafter referred to as Patent Document 1) and Japanese Patent Application Publication No. 2007-072511 (hereinafter referred to as Patent Document 2) each discloses a method of processing an inputted speech sound to output a message. According to the method described in Patent Document 1, an inputted speech sound is converted or combined with another sound so as to be closely associated with a virtual space before being outputted as a chat sound. According to the method described in Patent Document 2, a speech sound of a character assigned to a client terminal is synthesized and by using this character's speech sound, speech-sound data corresponding to a message inputted from the client terminal is generated.

Japanese Patent Application Publication No. Hei 9-006985 (hereinafter referred to as Patent Document 3) and Japanese Patent Application Publication No. Hei 10-079929 (hereinafter referred to as Patent Document 4) disclose a method of bringing a user other than a certain user into a view of the certain user. According to the method described in Patent Document 3, a distance between a first avatar a and a second avatar b is measured. If the distance is not more than a threshold value L and the first avatar a looks at the second avatar b, and if the distance is kept not more than a threshold value L for a time period not less than a threshold value T, the second avatar b is rotated in the current position or moved until the first and second avatars a and b look at each other. According to the method described in Patent Document 4, a graphically displayed icon representing a user who participates in a shared 3D space is brought into a view of another user in response to strength and feature quantity of the former user's speech sound.

Japanese Patent Application Publication No. 2001-228794 (hereinafter referred to as Patent Document 5) discloses a method of displaying, in a view of a user, a message of another user at a position varying in accordance with a position of the latter user, if the message is a text message. According to the method described in Patent Document 5, a position in which text-based information to be displayed of a speaker-user is determined on the basis of a distance between the speaker-user and a listener-user, a view of the listener-user, a 3D position of the speaker-user, and a vector indicating speaker-user's line of sight. Thereafter, the text-based information is outputted in the thus-determined position.

If the above conventional techniques are applied to a situation each user exchanges messages with a large number of other users, the following problems will arise. If the large number of other users simultaneously output messages, the methods of Patent Documents 1 and 2 allow the messages to have different tones and sounds. However, it is still difficult to recognize a certain message from these overlapping sounds. If there are a large number of users in a certain area, the methods of Patent Documents 3 and 4 keep the views of the certain user and the large number of other users frequently moving, so that the users have difficulties in continuing conversations. If a large number of messages are simultaneously displayed, the method of Patent Document 5 allows each message to be displayed in a position corresponding to a positional relationship between a listener-user and a speaker-user. However, it is still difficult to distinguish messages of one user from those of another.

SUMMARY OF THE INVENTION

The present invention provides a dialog server, a method, and a computer program thereof, of providing smooth communication between a large number of users in a virtual space.

According to a first aspect of the present invention, a dialog server for providing dialogs made by at least one user through at least one avatar in virtual space is provided. The dialog server includes: a position storage unit for storing at least one positional information on at least one avatar; an utterance receiver for receiving (i) at least one utterance of at least one avatar, and (ii) at least one utterance strength representing an importance or attention level of at least one utterance; an interest level calculator for calculating at least one interest level between two of at least one avatar to each other, based on at least one positional information of at least one avatar; a message processor for generating a message from at least one utterance in accordance with a value calculated from at least one interest level and at least one utterance strength; and a message transmitter for transmitting at least one message to at least one avatar.

According to another aspect of the present invention, a method of providing dialogs made by at least one user through at least one avatar in a virtual space is provided. The method includes the steps of: storing at least one positional information based on at least one avatar; receiving (i) at least one utterance from at least one avatar and (ii) at least one utterance strength representing an importance or attention level of at least one utterance; calculating at least one interest level between two avatars based on their positional information; generating at least one message from at least one utterance in accordance with a value calculated from the interest level and the utterance strength; and transmitting at least one message to other avatars.

According to another aspect of the present invention, a computer readable article of manufacture tangibly embodying computer readable instructions for executing the steps of the above method.

BRIEF DESCRIPTION OF THE DRAWINGS

For a more complete understanding of the embodiments of the present invention and the advantages thereof, reference is now made to the following descriptions taken in conjunction with the accompanying drawings.

FIGS. 4-1 to 4-5 illustrate Example 1 of the present invention.

FIGS. 5-1 to 5-5 illustrate a situation subsequent to FIGS. 4-1 to 4-5.

FIGS. 6-1 to 6-5 illustrate a situation subsequent to FIGS. 5-1 to 5-5.

FIGS. 7-1 to 7-5 illustrate a situation subsequent to FIGS. 6-1 to 6-5.

FIGS. 8-1 to 8-3 are perspective views, each showing the positional relationship (between the avatars of a speaker and a listener) used for calculating a value from interest levels and the voice volume of an utterance in the embodiment of the present invention.

FIGS. 9-1 to 9-4 illustrate Example 2 of the present invention.

FIGS. 10-1 to 10-4 illustrate Example 2 of the present invention.

FIGS. 11-1 to 11-4 illustrate a situation subsequent to FIGS. 10-1 to 10-4.

FIGS. 12-1 to 12-4 illustrate a situation subsequent to FIGS. 11-1 to 11-4.

FIGS. 13-1 to 13-4 illustrate a situation subsequent to FIGS. 12-1 to 12-4.

FIGS. 14-1 to 14-4 illustrate a situation subsequent to FIGS. 13-1 to 13-4.

FIGS. 15-1 to 15-4 illustrate a situation subsequent to FIGS. 14-1 to 14-4.

FIGS. 16-1 to 16-4 illustrate a situation subsequent to FIGS. 15-1 to 15-4.

DETAILED DESCRIPTION OF THE PREFERRED EMBODIMENTS

A description of preferred embodiments of the present invention follows with reference to the drawings.

The term "virtual space" in the context of the present invention means a collection of data in which background scenery and objects each having a position and a direction are arranged. The term "avatar" means an object associated with a user as a character representing the user in a virtual space.

"Utterance strength" is a value indicating deliverability of an utterance, and represents, for example, a voice volume of the utterance. It is also an importance level of the utterance for an avatar making the utterance, and further, it is an attention level of the utterance for an avatar receiving the utterance. The utterance strength is attached to an utterance by an avatar making the utterance.

"Interest level" is defined herein as being a value indicating utterance deliverability between two avatars, and automatically calculated in accordance with a positional relationship including each direction from one avatar to the other and a distance between the avatars.

If a certain avatar makes an utterance, the dialog server can transmit a content of the utterance to each of other avatars as a message in accordance with a value calculated from the utterance strength and the interest levels of the certain avatar to the each of other avatars and of the each of other avatars to the certain avatar. As a result, an utterance of an avatar is delivered to another avatar in accordance with a value which is calculated from interest levels automatically calculated from positions of the avatars and utterance strength of the utterance. Thus, the dialog server can provide a smooth communication using a conversation in a virtual space where a large number of users participate.

If a certain avatar makes an utterance, the dialog server can transmit the utterance to each of other avatars when a value calculated from the utterance strength and the interest levels of the certain avatar to the each of other avatars and of the each of other avatars to the certain avatar is not less than a predetermined value. As a result, an utterance of an avatar is delivered to another avatar when a value which is calculated from interest levels automatically calculated from positions of the avatars and utterance strength of the utterance is not less than a predetermined value. Thus, the dialog server can provide a smooth communication using a conversation in a virtual space where a large number of users participate.

Figure 1:
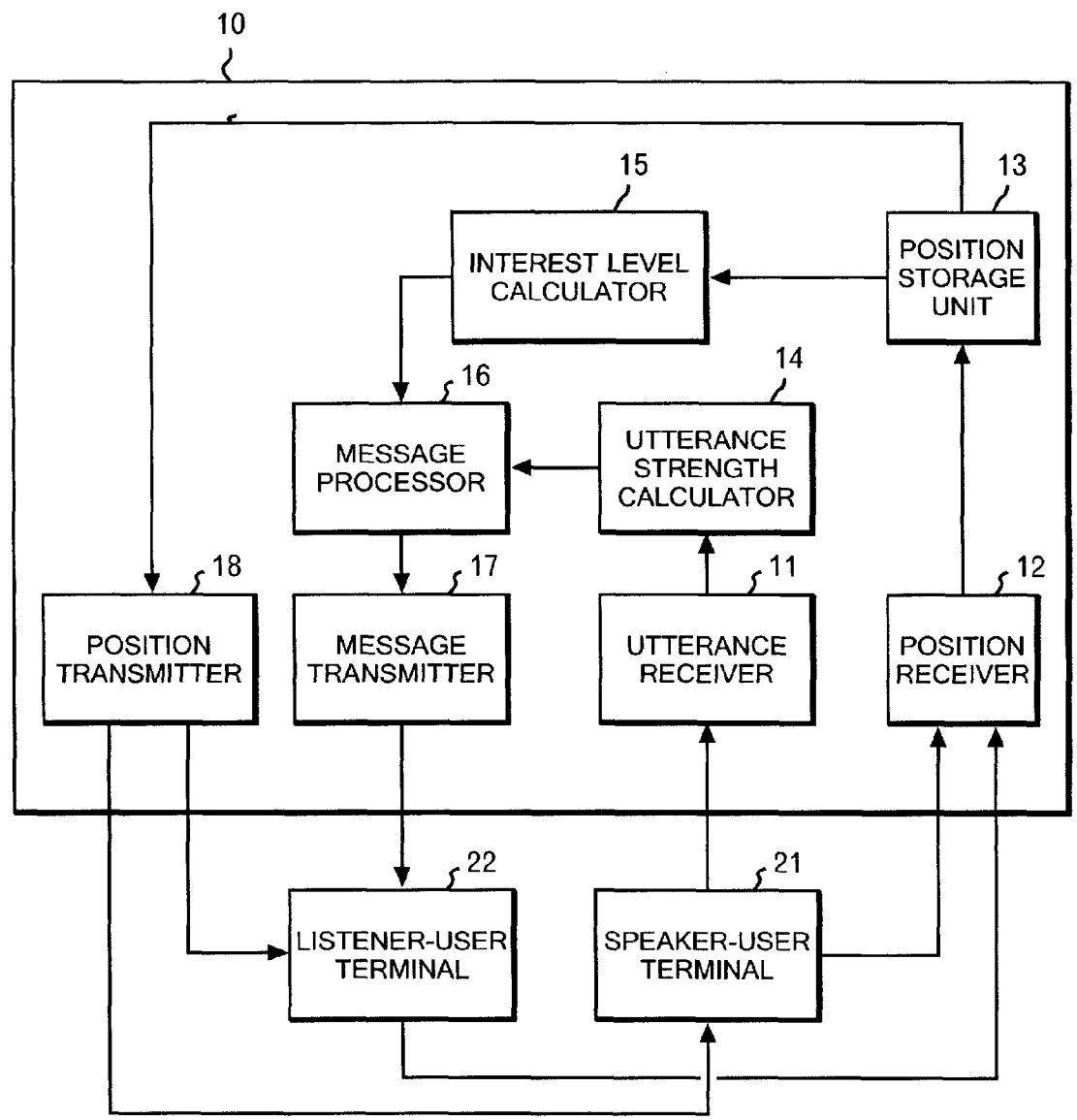
FIG. 1 is a functional block diagram showing a configuration of a dialog server according to an embodiment of the present invention.

Referring to FIG. 1, a functional block diagram showing a configuration of a dialog server as an example of an embodiment of the present invention is provided. A dialog server 10 receives utterance data and utterance strength data transmitted by a speaker-user terminal 21 via an utterance receiver 11. The utterance data can be either text data or sound data. The utterance strength data indicates deliverability of an utterance of a speaker to a listener. For example, the utterance strength data can indicate a value designated by a speaker, as data separate from the utterance data, or can indicate voice volume of the utterance of sound data.

Dialog server 10 also receives positional information data transmitted by the speaker-user terminal 21 or the listener-user terminal 22, through a position receiver 12. The positional information data indicates the positions of avatars respectively representing one or more speakers and one or more listeners in a virtual space. For example, the positional information data includes an avatars' coordinate information in the virtual space and an avatars' facing directions.

A position storage unit 13 stores the received positional information on the avatars of the speakers and listeners. If the position storage unit 13 has already stored any positional information, it updates the stored positional information, and stores the updated positional information. The interest level calculator 15 reads the positional information stored in the position storage unit 13, and calculates the interest levels of the speakers to the listeners and interest levels of the listeners to the speakers from the positional relationships between the avatars of the speakers and listeners.

An utterance strength calculator 14 calculates the utterance strength from either the utterance data or the utterance strength data received from the utterance receiver 11. For example, in the case where the utterance strength data indicates a value designated and inputted by a speaker, as data separate from the utterance data, the value can be normalized to be made into the utterance strength. In the case where the utterance strength data indicates voice volume of the utterance of sound data, the voice volume can be normalized to be made into the utterance strength.

Message processor 16 processes the utterance in accordance with the interest levels calculated by the interest level calculator 15 and the utterance strength calculated by the utterance strength calculator 14, and thereby generates a message. For example, in generating the message, the message processor 16 can change the font size or the sound volume of the utterance in accordance with the interest levels and the utterance strength. Alternatively, message processor 16 can generate a message from the utterance only when a value calculated from the interest levels and the content of the utterance exceeds a certain threshold value.

Message transmitter 17 transmits the generated message to the listener-user terminal 22. The position transmitter 18 reads the positional information on the avatars of both the speakers and listeners stored in the position storage unit 13, and transmits the information to the speaker-user terminal 21 and the listener-user terminal 22, as positional information data.

Figure 2:
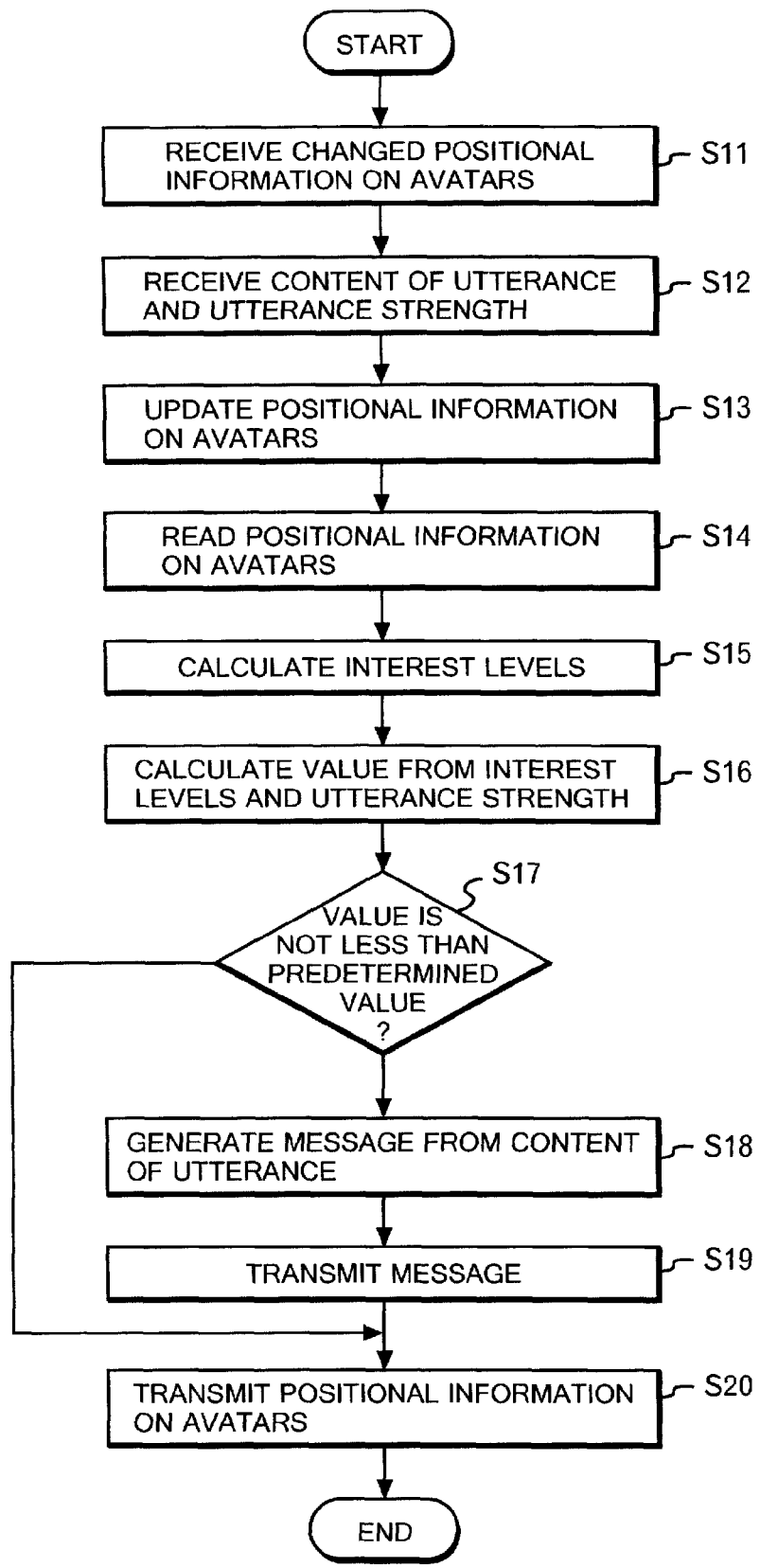
FIG. 2 is a flowchart showing a processing flow of the dialog server according to an embodiment of the present invention.

FIG. 2 is a flowchart showing a processing flow of the dialog server 10 according to an embodiment of the present invention. The dialog server 10 receives positional information data on avatars of one or more speakers and one or more listeners in a virtual space (step S11), as well as utterance data and utterance strength data of each speaker (step S12).

In step S13, the dialog server 10 updates positional information on the avatars of speakers and listeners based on the positional information data received in step S11. Thereafter, the dialog server 10 reads the updated positional information on the avatars of the speakers and listeners (step S14), and calculates the interest levels based on the updated positional information on the avatars of the speakers and listeners (step S15).

In step S16, dialog server 10 calculates a value from both the interest levels of the avatars of the speakers and listeners and the utterance strength calculated from the utterance strength data received in step S12. Thereafter, dialog server 10 determines whether or not the calculated value is not less than a predetermined value (step S17). If the calculated value is not less than the predetermined value, the processing proceeds to step S18. If the calculated value is less than the predetermined value, the processing proceeds to step S20.

In step S18, dialog server 10 generates a message from the content of the utterance received in step S12. Thereafter, the dialog server 10 transmits the generated message (step S19). In step S20, the dialog server 10 transmits, as positional information data, positional information on the avatars which is updated in step S13.

Figure 3:
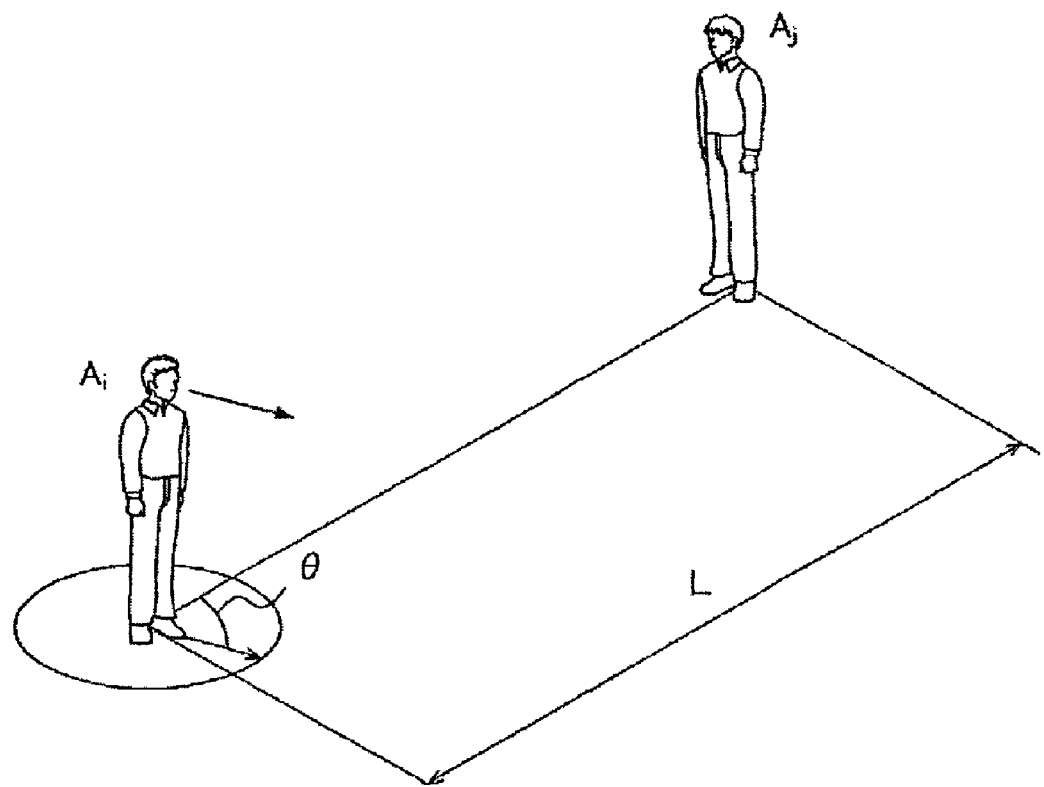
FIG. 3 is a perspective view showing a positional relationship between avatars of a speaker and a listener used for calculating an interest level in an embodiment of the present invention.

FIG. 3 is a perspective view showing a positional relationship between avatars of a speaker and a listener used for calculating an interest level in an embodiment of the present invention. An interest level $I_{i,j}$ of an avatar $A_i$ to an avatar $A_j$ in a virtual space is defined as shown in the following expression (1):

[Expression 1]

$$I_{i,j} = d \frac{\cos\theta}{L} \quad (1)$$

where θ is an angle made by a facing direction of the avatar $A_i$ and a straight line connecting positions of the respective avatars $A_i$ and $A_j$, and L is a distance between the avatars $A_i$ and $A_j$. Here, d is a term for normalizing an interest level of a speaker or a listener to satisfy the following expression (2):

[Expression 2]

$$\sum_{j=1}^{n} I_{i,j} = 1 \quad (2)$$

where n is the number of avatars who exist in a circular region whose center is the position of the avatar $A_i$ and whose radius $r_i$ is a predetermined distance.

Figure 4:
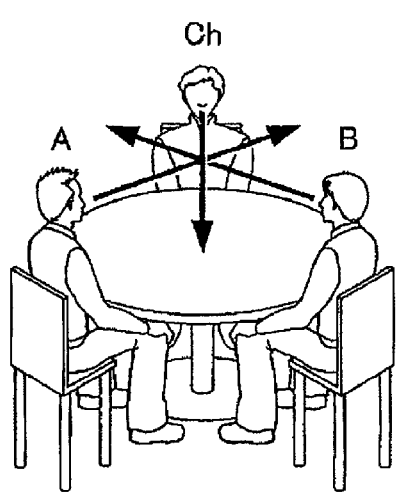
Figure 4:
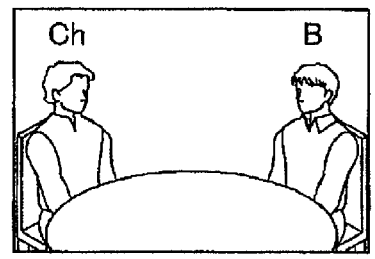
Figure 4:
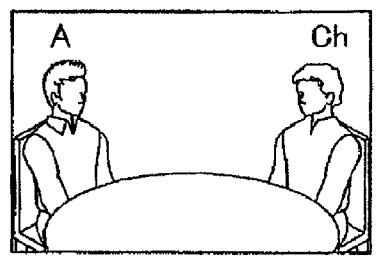
Figure 4:
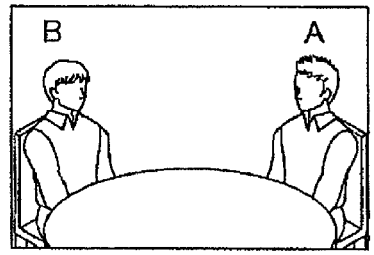

FIGS. 4-1 to 7-5 illustrate Example 1 of the present invention. FIG. 4-1 is a perspective view showing three avatars A, B and Ch sitting around a circular table in a virtual space. A, B and Ch sit in the positions located at the same distance from the center of the table while facing the center of the table. More specifically, straight lines connecting the center of the table and the respective positions of A, B and Ch are 120° of each other.

FIG. 4-2 shows A's view. A faces the midpoint between B and Ch. FIG. 4-3 shows B's view. B faces the midpoint between A and Ch. FIG. 4-4 shows Ch's view. Ch faces the midpoint between A and B.

Figure 5:
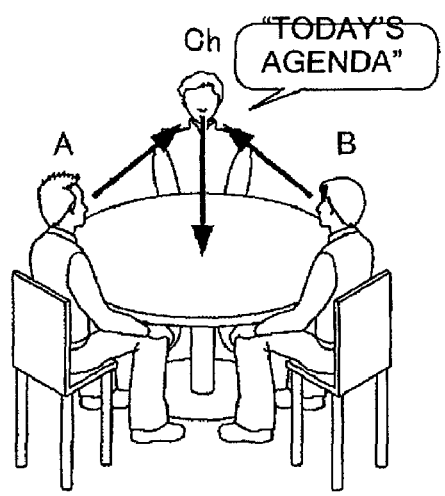
Figure 5:
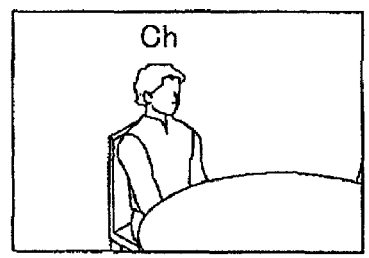
Figure 5:
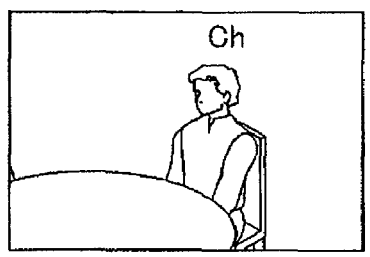
Figure 5:
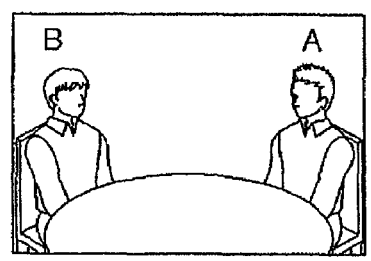

FIG. 4-5 is a table summarizing interest levels between A, B and Ch. A, B and Ch sit at respective vertices of an equilateral triangle, so that the distances between A, B and Ch are the same. Since each of the avatars A, B and Ch face the midpoint of the opposite side of this equilateral triangle, the facing direction of each avatar and the directions from the avatar to the other respective avatars are at the same angle, in this case, 30°. From above expressions (1) and (2), the interest levels between A, B and Ch are set to the same value. It is assumed that an utterance of one avatar is delivered to another as a message, if an interest level from the latter avatar to the former avatar is not less than 0.5. Accordingly, in the situation shown in FIG. 4-5, an utterance of any of the avatars is delivered to the other avatars as messages.

FIG. 5-1 is a perspective view showing a situation subsequent to FIG. 4-1. Ch speaks while A and B look at Ch. FIG. 5-2 shows A's view. A looks at Ch. FIG. 5-3 shows B's view. B looks at Ch. FIG. 5-4 shows Ch's view. Ch faces the midpoint between A and B.

FIG. 5-5 is a table summarizing interest levels between A, B and Ch. A and B look at Ch. Accordingly, the interest levels of A to Ch and B to Ch has increased, while the interest levels of A to B and B to A has decreased. The facing direction of Ch remains unchanged from the situation shown in FIG. 4, so that the interest levels of Ch to A and Ch to B also remain unchanged from that situation.

In the situation shown in FIG. 5-5, A's utterances are delivered to Ch as messages, but not to B. Similarly, B's utterances are delivered to Ch as messages, but are not to A. On the other hand, Ch's utterances are delivered to both A and B as messages. These conditions allow only Ch's utterances to be delivered to A and B as messages. Accordingly, A and B can hear only the Ch's utterances as messages.

Figure 6:
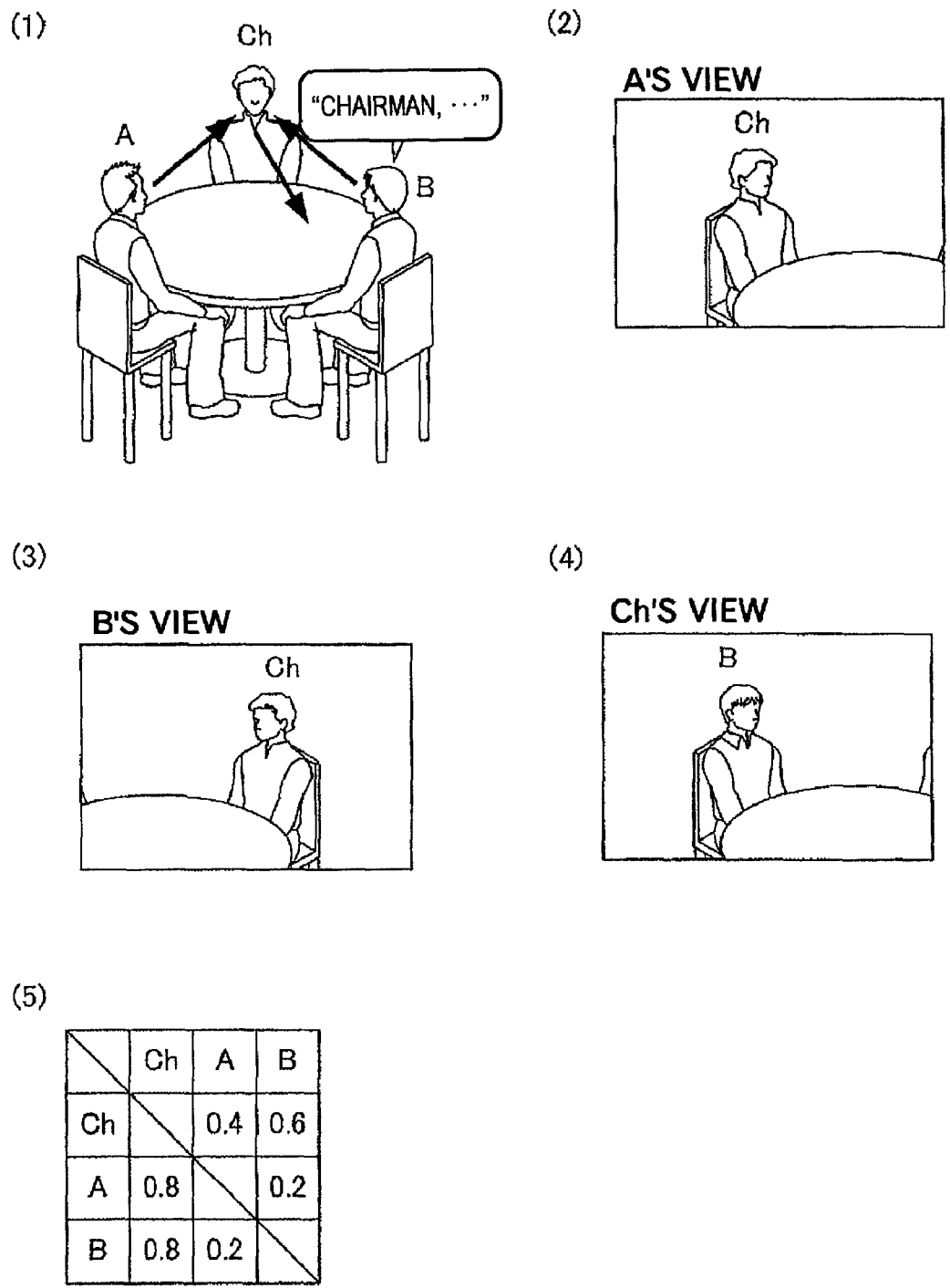

FIG. 6-1 is a perspective view showing a situation subsequent to FIG. 5-1. B speaks to Ch, and Ch faces a point closer to B than the midpoint between A and B. A and B look at Ch. FIG. 6-2 shows A's view. A looks at Ch. FIG. 6-3 shows B's view. B looks at Ch. FIG. 6-4 shows Ch's view. Ch faces the point closer to B than the midpoint between A and B.

FIG. 6-5 is a table summarizing interest levels between A, B and Ch. A and B look at Ch as similar to the situation shown in FIG. 5. Accordingly, the interest levels of A to Ch, B to Ch, A to B and B to A remain unchanged from the situation shown in FIG. 5. Ch faces the point closer to B than the midpoint between A and B, so that the interest level of Ch to B has increased over the situation shown in FIG. 5, while the interest level of Ch to A has decreased as compared to the situation shown in FIG. 5.

In the situation shown in FIG. 6-5, A's utterances are not delivered to Ch or B. B's utterances are delivered to Ch as messages, but not to A. Similarly, Ch's utterances are delivered to B as messages, but not to A. These conditions allow Ch and B to have a conversation without being interrupted by any A's utterance, while preventing A from being disturbed by any of B's personal questions.

Figure 7:
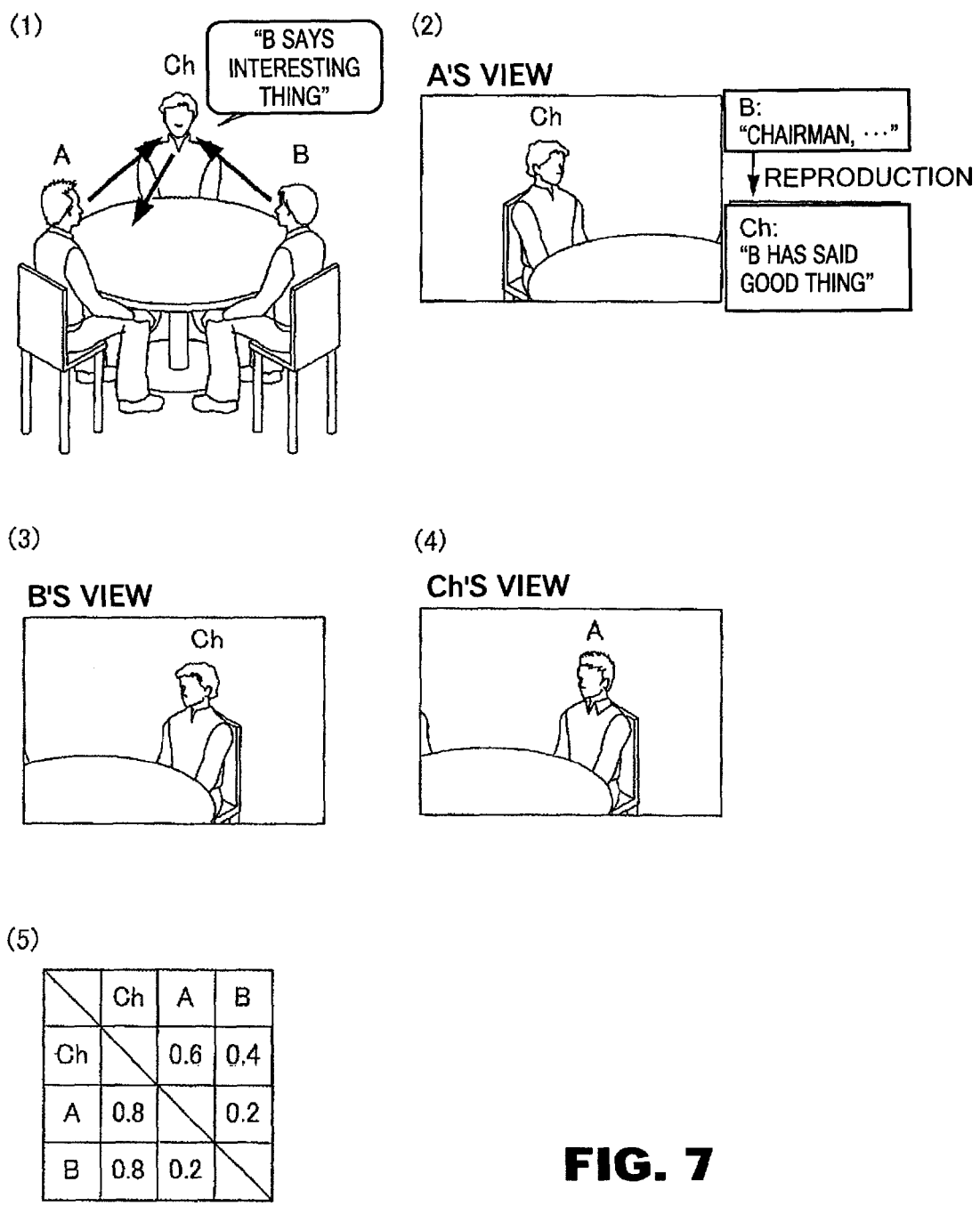

FIG. 7-1 is a perspective view showing a situation subsequent to FIG. 6-1. Ch speaks to A, while facing a point closer to A than the midpoint between A and B. A and B look at Ch. FIG. 7-2 shows A's view. A looks at Ch. FIG. 7-3 shows B's view. B looks at Ch. FIG. 7-4 shows Ch's view. Ch faces the point closer to A than the midpoint between A and B.

FIG. 7-5 is a table summarizing interest levels between A, B and Ch. A and B look at Ch similar to the situation shown in FIG. 6. Accordingly, the interest levels of A to Ch, B to Ch, A to B and B to A remain unchanged from the situation shown in FIG. 6. Ch faces the point closer to A than the midpoint between A and B, so that the interest level of Ch to A has increased over the situation shown in FIG. 6, while the interest level of Ch to B has decreased as compared to the situation shown in FIG. 6.

In the situation shown in FIG. 7-5, A's utterances are delivered to Ch as messages, but not to B. B's utterances are not delivered to Ch or A. In addition, Ch's utterances are delivered to A as messages, but not to B. In FIG. 7-2, dialog between Ch and B is exchanged. This dialog is sequentially reproduced to be delivered to A as messages. This allows A to trace the content of the conversation between Ch and B, and accordingly allows Ch to deliver B's valuable remarks to A while preventing B from hearing what has already been said to B. This sequential reproduction can be deactivated by either A or Ch.

In the above Example 1, an interest level of each avatar calculated from the positional information of avatars is a value that becomes larger as (1) the direction from one avatar becomes closer to the direction of another avatar or (2) as the avatar stands closer to another avatar. Afterwards, it is determined whether or not to deliver an utterance of the avatar to the certain avatar as a message based on the calculated interest level. Accordingly, whether or not to deliver an utterance as a message can be automatically chosen in accordance with positions of the avatars.

As mentioned in Example 1, when the avatar acquires only a low interest level, certain dialogs are not delivered to an avatar as messages. Even in this case, if the message delivery is resumed in response to the fact that the avatar acquires a high interest level, the undelivered messages can be sequentially delivered to the avatar. In that event, the user of the avatar can choose whether or not to hear the undelivered messages.

Figure 8:
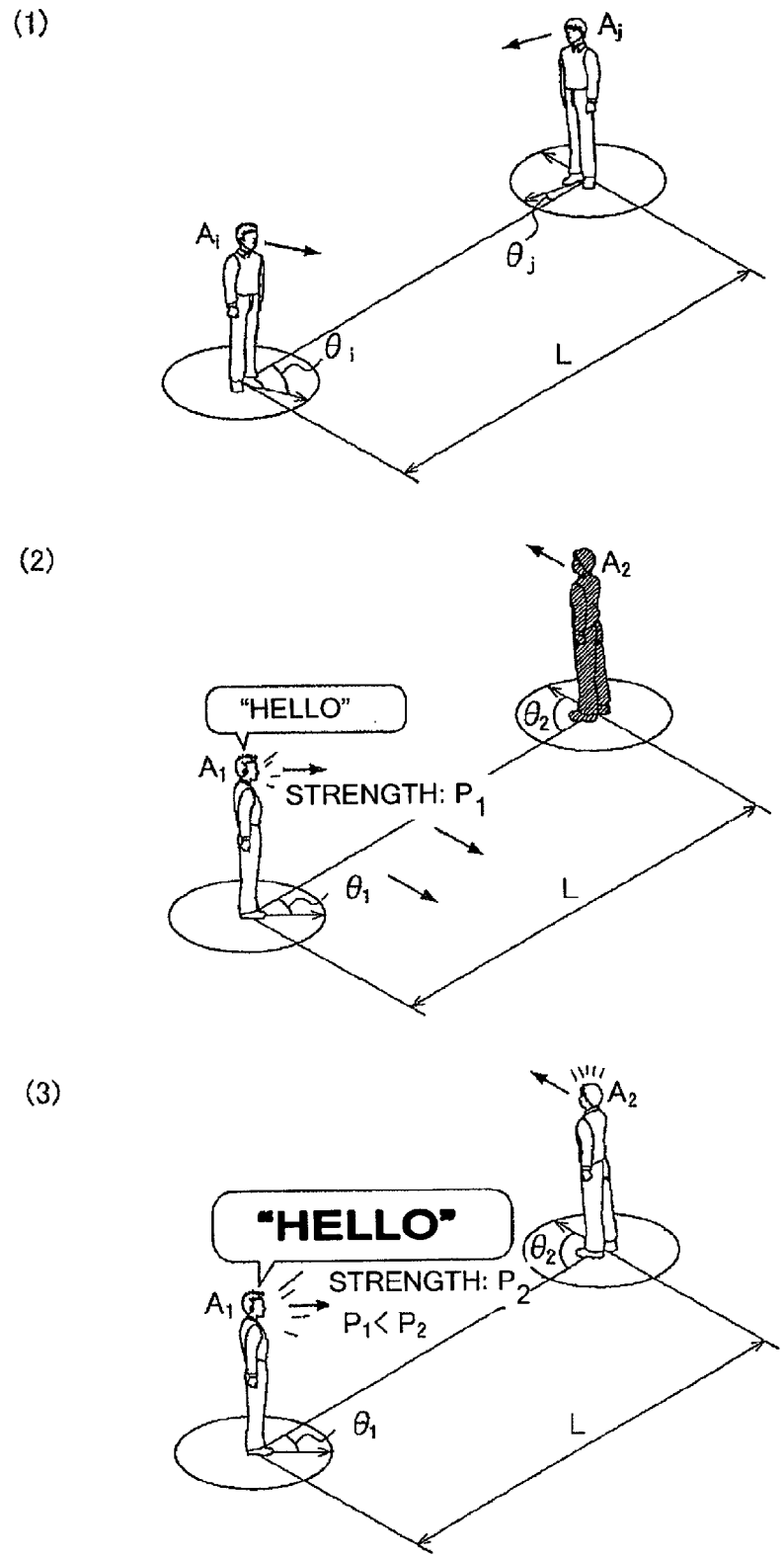

FIGS. 8-1 to 8-3 are perspective views each showing a positional relationship between avatars of a speaker and a listener used for determining whether or not to deliver an utterance as a message in another embodiment of the present invention. Specifically, such determination is made based on a scale value calculated from interest levels and a voice volume of the utterance. FIG. 8-1 is a perspective view showing a positional relationship between avatars $A_i$ and $A_j$ in a virtual space. A condition under which an $A_i$'s utterance is delivered to $A_j$ as a message is defined on the basis of a preset threshold level TH as shown in the following expression (3):

$$I_{i,j} = d_i \frac{\cos\theta_i}{L}$$ [Expression 3]

$$I_{j,i} = d_j \frac{\cos\theta_j}{L}$$

$$I_{i,j} \times p_i + I_{j,i} > TH$$

where $\theta_i$ is an angle made by the facing direction of $A_i$ and a straight line connecting positions of $A_i$ and $A_j$. $\theta_j$ is an angle made by a facing direction of $A_j$ and a straight line connecting positions of $A_i$ and $A_j$. L is a distance between the avatars $A_i$ and $A_j$, and $p_i$ is a voice volume of the $A_i$'s utterance. Here, $d_i$ and $d_j$ are terms used for the normalization mentioned previously.

FIG. 8-2 is a perspective view showing a situation where the avatar $A_1$ speaks to the avatar $A_2$ at a voice volume level $p_1$. In this case, the following result is obtained instead of the expression (3):

$$I_{1,2} = d_1 \frac{\cos\theta_1}{L}$$ [Expression 4]

$$I_{2,1} = d_2 \frac{\cos\theta_2}{L}$$

$$I_{1,2} \times p_1 + I_{2,1} \leq TH$$

This means that this situation does not satisfy the condition defined in the expression (3), and thus $A_1$'s utterances are not delivered to $A_2$ as messages. Accordingly, the displayed image of $A_2$ is darkened to indicate that $A_1$'s messages are not delivered to $A_2$.

FIG. 8-3 is a perspective view showing a situation where the avatar $A_1$ speaks to the avatar $A_2$ at a voice volume level $p_2$. In this case, the following result is obtained instead of the expression (3):

$$I_{1,2} = d_1 \frac{\cos\theta_1}{L}$$ [Expression 5]

$$I_{2,1} = d_2 \frac{\cos\theta_2}{L}$$

$$I_{1,2} \times p_2 + I_{2,1} > TH$$

This means that this situation satisfies the condition defined in Expression 3, and thus $A_1$'s utterances are delivered to $A_2$ as messages. Accordingly, the displayed image of $A_2$ returns to normal indicating that $A_1$'s messages are delivered to $A_2$.

Figure 9:
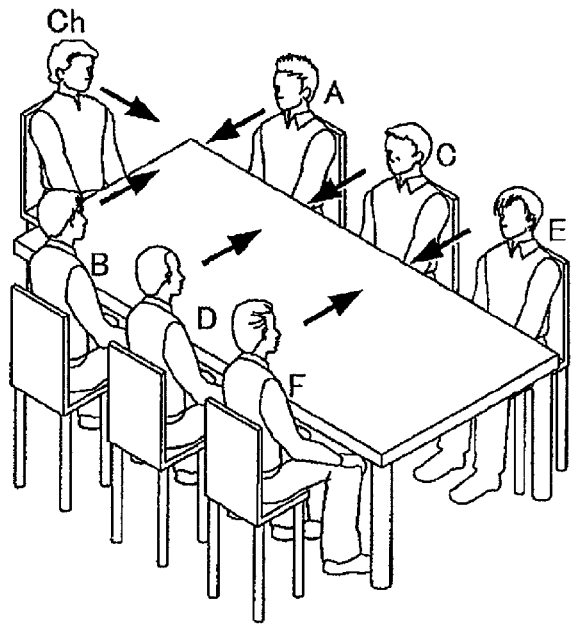
Figure 9:
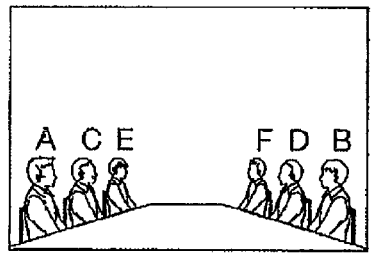
Figure 9:
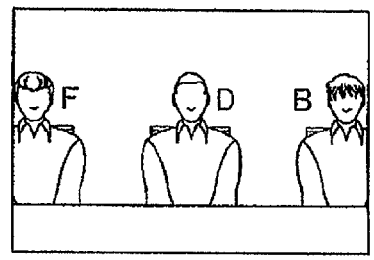
Figure 9:
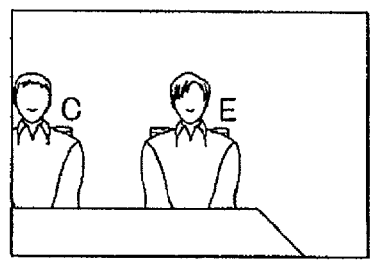

FIGS. 9-1 to 16-4 illustrate Example 2, which is another embodiment of the present invention. FIG. 9-1 is a perspective view showing seven avatars A to F and Ch sitting around a rectangular table in a virtual space. Among A to F, three avatars sit at one longer side of the table and the remaining three avatars sit at the other longer side of the table. More specifically, the avatars at each side sit at regular intervals while facing the avatars at the other side. Ch sits at a shorter side of the table while facing in a direction perpendicular to the facing directions of A to F.

FIG. 9-2 shows Ch's view. A to F sit at the longer sides of the tables while A, C and E face B, D and F, respectively. Ch sits at the midpoint of the shorter side which is closer to A and B facing each other while facing the midpoint of the opposite side. FIG. 9-3 shows C's view. D who faces C is seen in front of C, B who faces A is seen at a position closer to Ch, and F who faces E is seen at a position more distant from Ch. FIG.

9-4 shows F's view. E who faces F is seen in front of F, and C who faces D is seen at a position closer to Ch.

Figure 10:
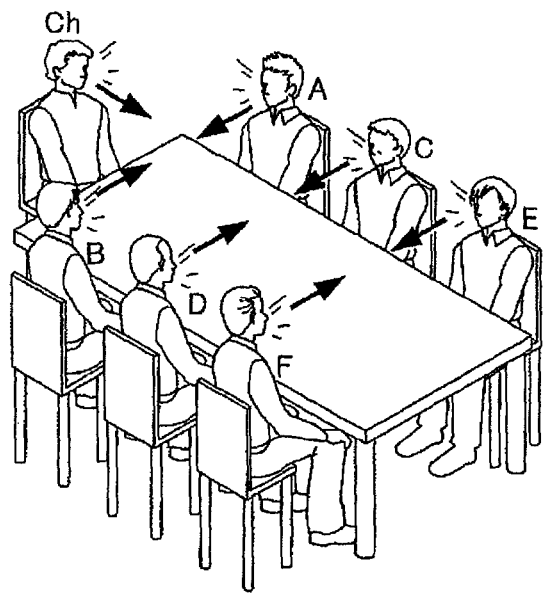
Figure 10:
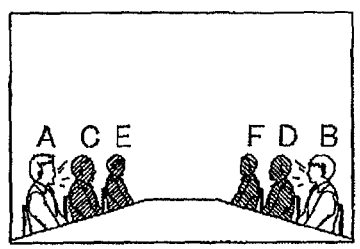
Figure 10:
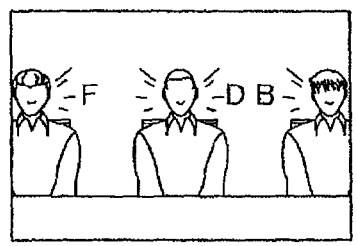
Figure 10:
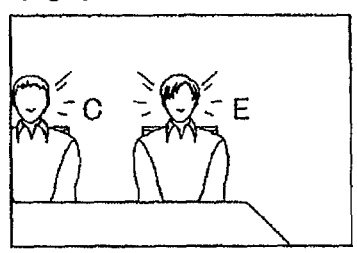

FIG. 10-1 is a perspective view showing a situation subsequent to FIG. 9-1. A to F and Ch face the same direction as in the situation shown in FIG. 9-1, and speak with a normal voice volume. FIG. 10-2 shows Ch's view. Since A and B sit closer to Ch, their utterances with a normal voice volume satisfy the condition defined in the expression (3), and thus are delivered to Ch as messages. On the other hand, since C to F sit farther from Ch, their utterances with a normal voice volume do not satisfy the condition defined in the expression (3), and thus are not delivered to Ch as messages. Similarly, since C to F sit farther from Ch, Ch's utterances with a normal voice volume do not satisfy the condition defined in the expression (3), and thus are not delivered to Ch as messages. Accordingly, the display images of C to F are darkened in the Ch's view as shown in FIG. 10-2.

FIG. 10-3 shows C's view. Utterances with a normal voice volume of B, D and F are delivered to C as messages. Since each of B, D and F is regarded as sitting at a distance and in a direction from C which allow C's utterances with a normal voice volume to be delivered to the each of B, D and F as messages, the display images of B, D and F are normal in C's view. FIG. 10-4 shows F's view. Utterances of E and C are delivered to F as messages. Since both E and C are regarded as sitting at a distance and in a direction from F which allow F's utterances with a normal voice volume to be delivered to the each of E and C as messages, the display images of E and C are normal in the F's view.

Figure 11:
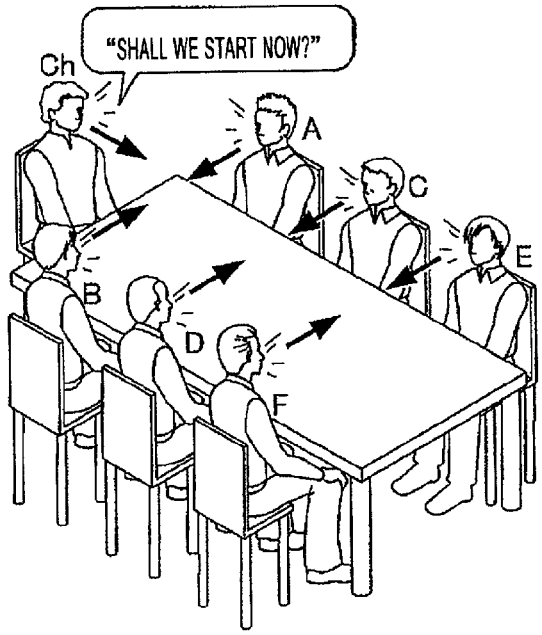
Figure 11:
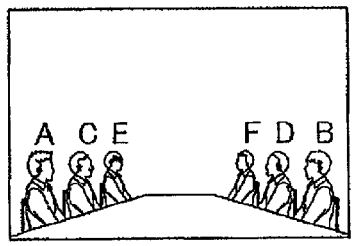
Figure 11:
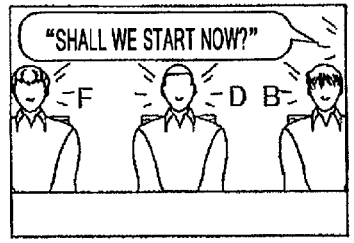
Figure 11:
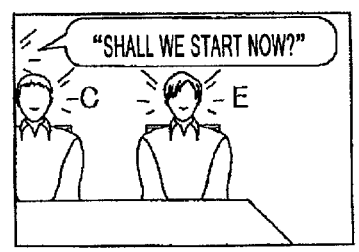

FIG. 11-1 is a perspective view showing a situation subsequent to FIG. 10-1. Ch faces the same direction as in the situation shown in FIG. 10-1, and speaks with a voice louder than normal. FIG. 11-2 shows Ch's view. Ch speaks with the louder voice, and thus Ch's message is even delivered to C to F. Accordingly, the display images of C to F which are darkened in the situation shown in FIG. 10 now become normal in Ch's view.

FIG. 11-3 shows C's view. Ch speaks with the louder voice, and thus Ch's message is delivered to C even though Ch is out of the C's view. FIG. 11-4 shows F's view. Ch speaks with the louder voice, and thus Ch's message is delivered to F even though Ch is out of the F's view.

Figure 12:
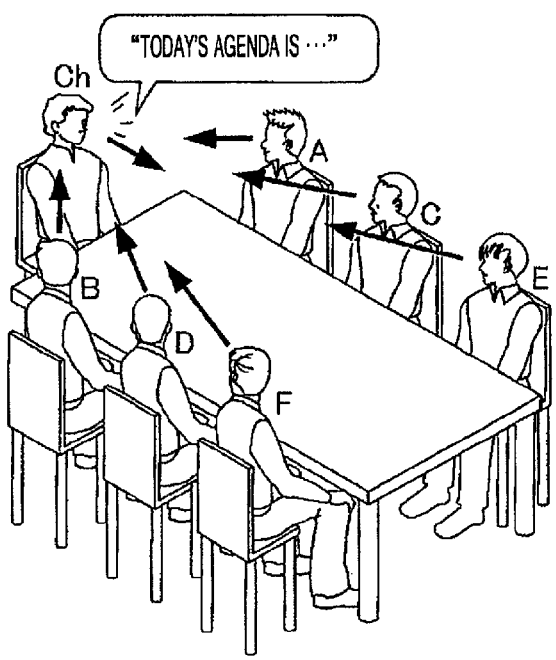
Figure 12:
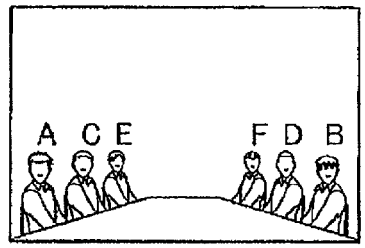
Figure 12:
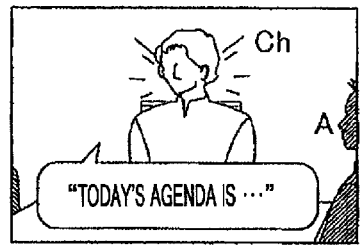
Figure 12:
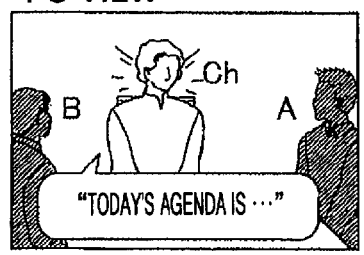

FIG. 12-1 is a perspective view showing a situation subsequent to FIG. 11-1. Since Ch's utterance with the louder voice in the situation shown in FIG. 11-1 is delivered to A to F as a message, all the avatars look at Ch now. Ch faces the same direction as in the situation shown in FIG. 11-1, and speaks with a normal voice volume.

FIG. 12-2 shows Ch's view. Ch speaks with a normal voice volume. A to F are looking directly at Ch. Accordingly, even though C to F are regarded as sitting at a distance and in a direction from Ch which normally can not allow Ch's utterances with a normal voice volume to be delivered to C to F as messages, C to F are regarded as sitting at a distance and in a direction from Ch which allow Ch's utterances with a normal voice volume to be delivered to C to F as messages. Therefore the display images of C to F are normal in FIG. 10-2.

FIG. 12-3 shows C's view. C looks at Ch. Accordingly, C is regarded to sit at a distance and in a direction from Ch which allow Ch's utterances with a normal voice volume to be delivered to C as messages, and thus the display image of Ch is normal in the C's view. Ch's utterances with a normal voice volume are delivered to C as messages. A looks at Ch and the direction from C to A is some degrees away from the facing direction of C. Accordingly, A is regarded to sit at a distance and in a direction from C which allow none of C's utterances with a normal voice volume to be delivered to A as messages. Thus, the display image of A is darkened in the C's view as shown in FIG. 12-3.

FIG. 12-4 shows F's view. F looks at Ch. Accordingly, F is regarded to sit at a distance and in a direction from Ch which allow Ch's utterances with a normal voice volume to be delivered to F as messages, and thus the display image of Ch is normal in the F's view. Ch's utterances with a normal voice volume are delivered to F as messages. A and B look at Ch and the directions from F to A and to B are some degrees away from the facing direction of F. Accordingly, A and B are regarded as sitting at a distance and in a direction from F which allow none of F's utterances with a normal voice volume to be delivered to A or B as messages. Thus, the display images of A and B are darkened in the F's view as shown in FIG. 12-4.

Figure 13:
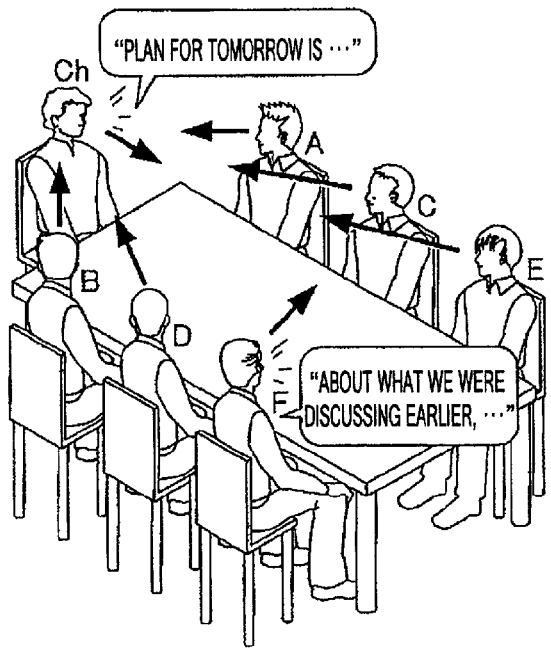
Figure 13:
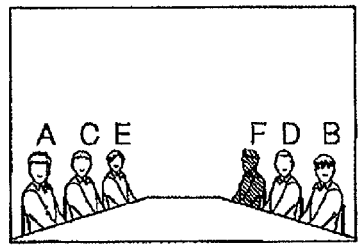
Figure 13:
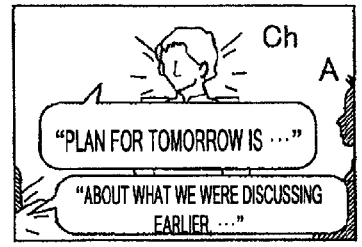
Figure 13:
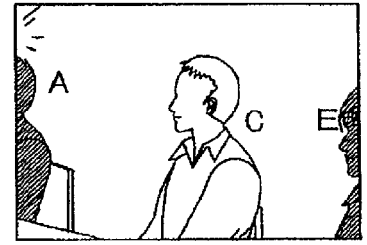

FIG. 13-1 is a perspective view showing a situation subsequent to FIG. 12-1. Ch faces the same direction as in the situation shown in FIG. 12-1, and speaks with a normal voice volume. A to E look at Ch while F looks at C. F speaks to C with a normal voice volume.

FIG. 13-2 shows Ch's view. Ch speaks with a normal voice volume, and A to E look at Ch. Accordingly, A to E are regarded as sitting at a distance and in a direction from Ch which allow Ch's utterances with a normal voice volume to be delivered to A to E as messages, and thus the display images of A to E are normal in the Ch's view. F looks at C. Accordingly, F is regarded as sitting at a distance and in a direction from Ch which allow none of Ch's utterances with a normal voice volume to be delivered to F as messages, and thus the display image of F is darkened in the Ch's view.

FIG. 13-3 shows C's view. C looks at Ch. Accordingly, C is regarded to sit at a distance and in a direction from Ch which allow Ch's utterances with a normal voice volume to be delivered to C as messages, and thus Ch's utterances with a normal voice volume are delivered to C as messages. F looks at C. Accordingly, C is regarded as sitting at a distance and in a direction from F which allow F's utterances with a normal voice volume to be delivered to C as messages, and thus F's utterance with a normal voice volume is delivered to C as a message.

A looks at Ch and the direction from C to A is some degrees away from the facing direction of C. Accordingly, A is regarded as sitting at a distance and in a direction from C which allow none of C's utterances with a normal voice volume to be delivered to A as messages. Thus, the display image of A is darkened in the C's view.

FIG. 13-4 shows F's view. Since F looks at C, F is regarded as sitting at a distance and in a direction from C which allow C's utterances with a normal voice volume, if they were, to be delivered to F as messages. Thus, the display image of C is normal in the F's view. A and E look at Ch and the directions from F to A and to E are some degrees away from the facing direction of F. Accordingly, A and E are regarded as sitting at a distance and in a direction from F which allow none of F's utterances with a normal voice volume to be delivered to A or E as messages. Thus, the display images of A and E are darkened in the F's view. These conditions allow F's utterances referring to earlier discussion to be delivered only to C selected by F as one to whom these utterances should be delivered as messages, while preventing A, B, D, E and Ch from hearing the utterances. This allows F to express opinions without interrupting the discussion on the table.

Figure 14:
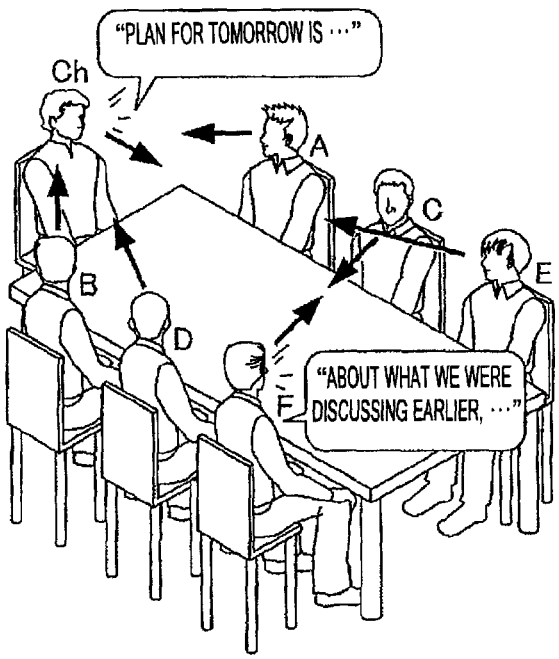
Figure 14:
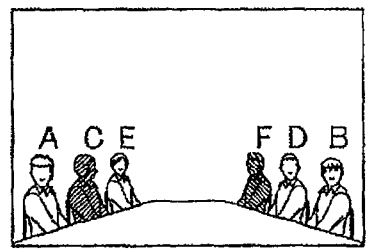
Figure 14:
Figure 14:
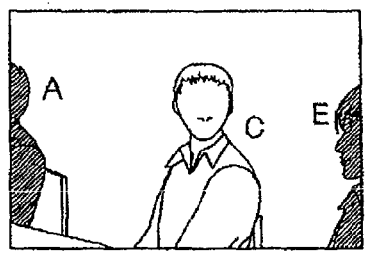

FIG. 14-1 is a perspective view showing a situation subsequent to that of FIG. 13-1. Ch faces the same direction as in the situation shown in FIG. 13-1, and speaks with a normal voice volume. A, B, D and E look at Ch, while F looks at C and speaks to C with a normal voice volume. Since F's utterance in the situation shown in FIG. 13 is delivered to C as a message, C looks at F now.

FIG. 14-2 shows Ch's view. Ch speaks with a normal voice volume while A, B, D and E look at Ch. Accordingly, A, B, D and E are regarded as sitting at a distance and in a direction from Ch which allow Ch's utterances with a normal voice volume to be delivered to A, B, D and E as messages, and thus the display images of A, B, D and E are normal in the Ch's view. F and C look at each other. Accordingly, C and F are regarded to sit at a distance and in a direction from Ch which allow none of Ch's utterances with a normal voice volume to be delivered to the C or F as messages, and thus the display images of C and F are darkened in the Ch's view.

FIG. 14-3 shows C's view. Since C and F look at each other, F is regarded as sitting at a distance and in a direction from C which allow C's utterances with a normal voice volume to be delivered to F as messages. Accordingly, the display image of F is normal in the C's view. F's utterances with a normal voice volume are delivered to C as messages. On the other hand, D looks at Ch and the direction from C to D is some degrees away from the facing direction of C. Accordingly, D is regarded as sitting at a distance and in a direction from C which allow none of C's utterances with a normal voice volume to be delivered to D as messages. Thus, the display image of D is darkened in the C's view.

FIG. 14-4 shows F's view. Since C and F look at each other, C is regarded as sitting at a distance and in a direction from F which allow F's utterances with a normal voice volume, if they were, to be delivered to C as messages. Thus, the display image of C is normal in the F's view. A and E look at Ch and the directions from F to A and F to E are some degrees away from the facing direction of F. Accordingly, A and E are regarded as sitting at a distance and in a direction from F which allow none of F's utterances with a normal voice volume to be delivered to the A or E as messages. Thus, the display images of A and E are darkened in the F's view.

C and F who face each other can see no other normal display images of avatars. Accordingly, C's utterances and F's utterances with a normal voice volume are not delivered to the avatars other than C and F, as messages. This allows C and F to discuss a topic different from one being discussed by all the avatars on the table without interrupting the discussion on the table.

Figure 15:
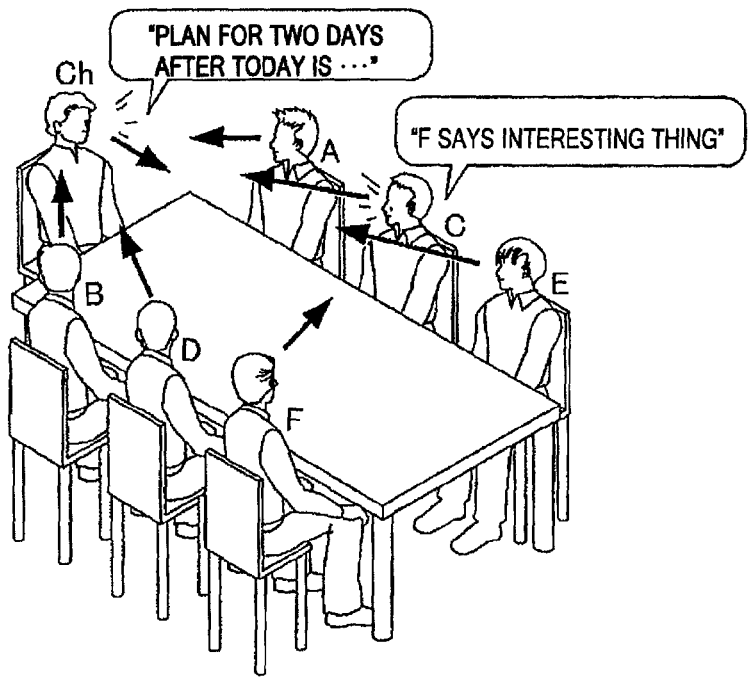
Figure 15:
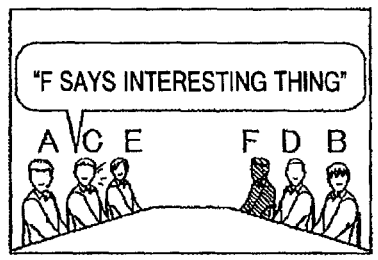
Figure 15:
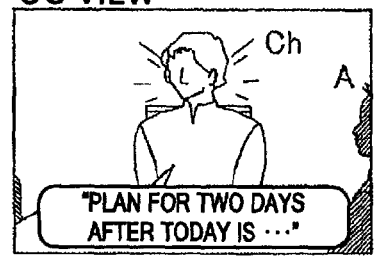
Figure 15:
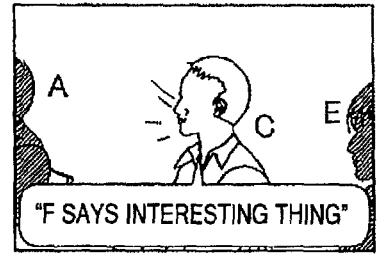

FIG. 15-1 is a perspective view showing a situation subsequent to that of FIG. 14-1. Ch faces the same direction as in the situation shown in FIG. 14-1, and speaks with a normal voice volume. A to E look at Ch. Among the avatars, C speaks with a normal voice volume while looking at Ch. F looks at C.

FIG. 15-2 shows Ch's view. C speaks to Ch with a normal voice volume, and A to E look at Ch. Accordingly, A to E are regarded as sitting at a distance and in a direction from Ch which allow Ch's utterances with a normal voice volume to be delivered to A to E as messages, and thus the display images of A to E are normal in the Ch's view. Since F looks at C, none of Ch's utterances with a normal voice volume is delivered to F as messages. Accordingly, the display image of F is darkened in the Ch's view. In this event, as in Example 1, dialogs between C and F can be sequentially reproduced. C and Ch can be allowed to choose whether or not to reproduce these dialogs.

FIG. 15-3 shows C's view. Since C looks at Ch, Ch is regarded as sitting at a distance and in a direction from C which allow C's utterances with a normal voice volume to be delivered to Ch as messages. Accordingly, the display image of Ch is normal in the C's view. Ch's utterance with a normal voice volume is delivered to C as a message. On the other hand, A looks at Ch and the direction from C to A is some degrees away from the facing direction of C. Accordingly, A is regarded as sitting at a distance and in a direction from C which allow none of C's utterances with a normal voice volume to be delivered to A as messages. Thus, the display image of A is darkened in the C's view.

FIG. 15-4 shows F's view. Since F looks at C, F is regarded as sitting at a distance and in a direction from C which allow F's utterances with a normal voice volume to be delivered to C as messages. Thus, the display image of C is normal in the F's view. Even though C speaks while looking at Ch, the distance between F and C is small enough and F looks at C. Accordingly, C is regarded as sitting at a distance and in a direction from F which allow C's utterances with a normal voice volume, if they were, to be delivered to F as messages.

C's utterance with a normal voice volume is delivered to F as a message. On the other hand, A and E look at Ch and the directions from F to A and F to E are some degrees away from the facing direction of F. Accordingly, A and E are regarded as sitting at a distance and in a direction from F which allow none of F's utterances with a normal voice volume to be delivered to the each of A and E as messages. Thus, the display images of A and E are darkened in the F's view.

Figure 16:
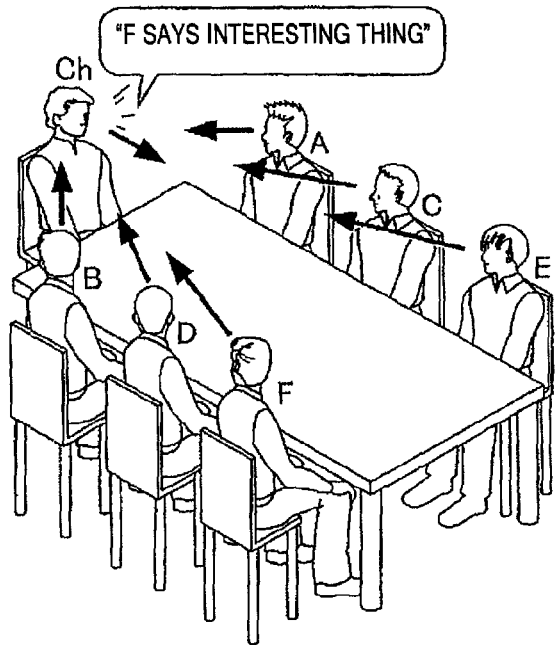
Figure 16:
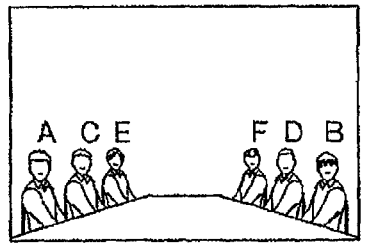
Figure 16:
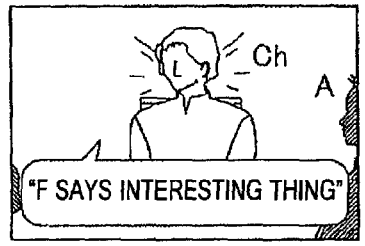
Figure 16:
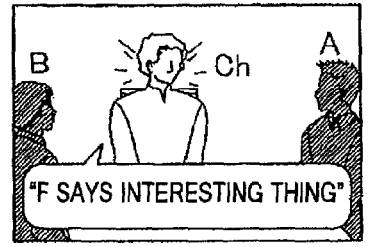

FIG. 16-1 is a perspective view showing a situation subsequent to that of FIG. 15-1. Ch, who has received C's utterance as a message, faces the same direction as in the situation shown in FIG. 15-1, and speaks on the message delivered from C with a normal voice volume. A to F look at Ch.

FIG. 16-2 shows Ch's view. Ch speaks with a normal voice volume, and A to F look at Ch. Accordingly, A to F are regarded as sitting at a distance and in a direction from Ch which allow Ch's utterances with a normal voice volume to be delivered to the each of A to F as messages, so that the display images of A to F are normal in the Ch's view. Ch's utterances with a normal voice volume are delivered to C as messages. In this event, as mentioned previously in Example 1, the dialog between C and F can be delivered to A to F as messages and be sequentially reproduced. A to F and Ch can be allowed to stop reproducing these messages.

FIG. 16-3 shows C's view. Ch speaks with a normal voice volume while C looks at Ch. Accordingly, C is regarded as sitting at a distance and in a direction from Ch which allow Ch's utterances with a normal voice volume to be delivered to C as messages, so that Ch's messages are delivered to C. A looks at Ch and the direction from C to A is some degrees away from the facing direction of C. Accordingly, A is regarded as sitting at a distance and in a direction from C which allow none of C's utterances with a normal voice volume to be delivered to A as messages. Thus, the display image of A is darkened in the C's view.

FIG. 16-4 shows F's view. Ch speaks with a normal voice volume while F looks at Ch. Accordingly, F is regarded as sitting at a distance and in a direction from Ch which allow Ch's utterances with a normal voice volume to be delivered to F as messages, so that Ch's messages are delivered to F. A and B look at Ch and the directions from F to A and to B are some degrees away from the facing direction of F. Accordingly, A and B are regarded as sitting at a distance and in a direction from F which allow none of F's utterances with a normal voice volume to be delivered to the each of A and B as messages. Thus, the display images of A and B are darkened in the F's view.

As mentioned previously in Example 1, whether or not to deliver an utterance as a message is determined according to the interest levels of speaker's avatar and listener's avatar, each of which is automatically determined on the basis of each direction from one to the other and a distance between the avatars. By contrast, as mentioned previously in Example 2, a voice volume of an utterance is set as utterance strength in addition to such interest levels. Thus, if a value obtained from the utterance strength and the interest levels exceeds a predetermined threshold value, the corresponding utterance is delivered to the listener's avatar as a message. Accordingly, whether or not to deliver an utterance as a message can be determined by a method similar to that in real-world conversation. This allows a user of an avatar representing himself/herself to automatically select to which avatar to deliver an utterance as a message, only by causing the user's avatar to behave in a virtual space as if it were in the real world, more specifically, to appropriately move and to speak with an appropriate voice volume.

Figure 17:
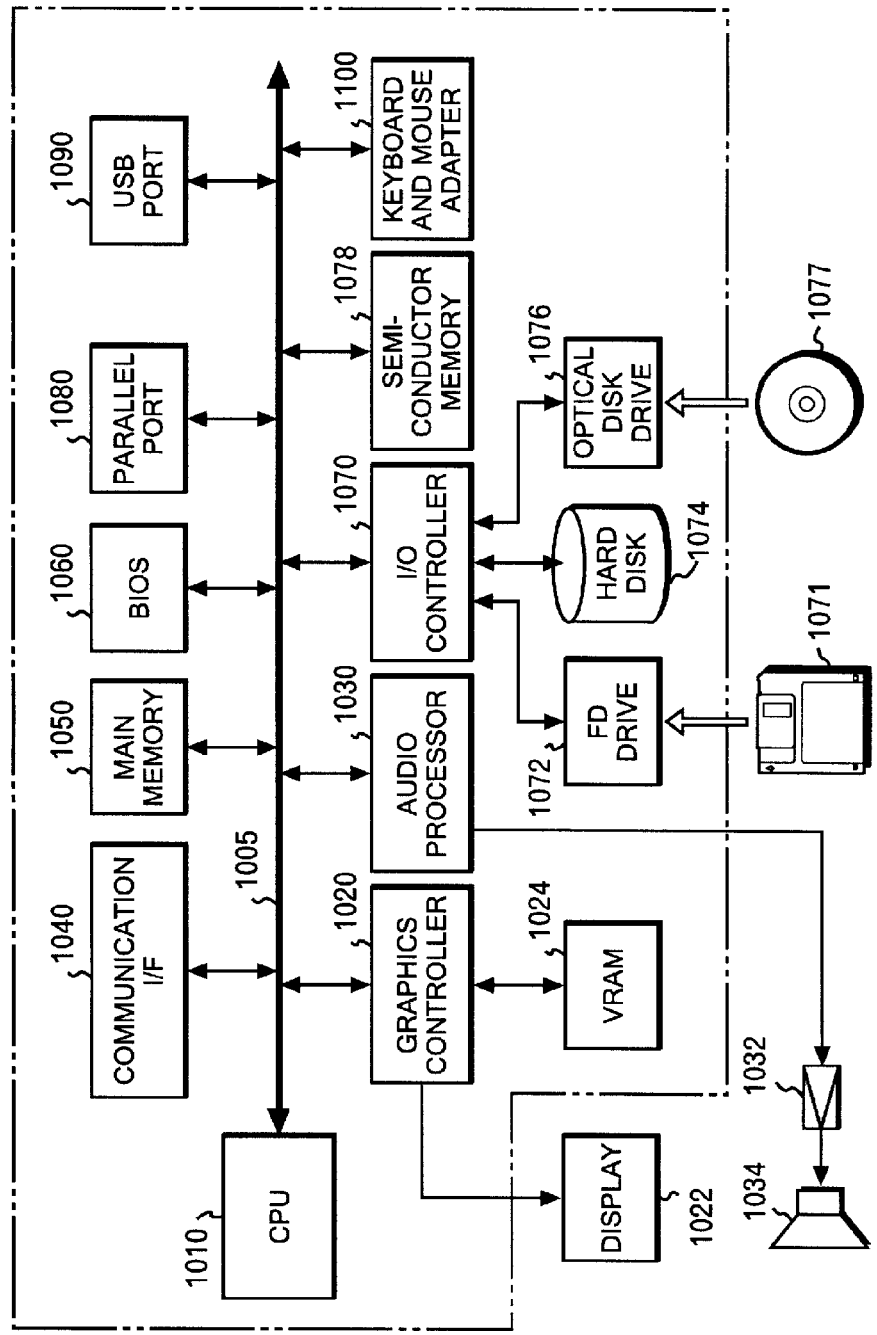
FIG. 17 shows an information processor as a typical example of a hardware configuration of the dialog server, a speaker-user terminal and a listener-user terminal.

FIG. 17 shows an example of a hardware configuration of an information processor 100 as a typical example of a hardware configuration of the dialog server 10, the speaker-user terminal 21 and the listener-user terminal 22 described in the FIG. 1. The information processor 100 includes a central processing unit (CPU) 1010, a bus line 1005, a communication I/F 1040, a main memory 1050, a basic input output system (BIOS) 1060, a parallel port 1080, an USB port 1090, graphics controller 1020, a VRAM 1024, an audio processor 1030, an I/O controller 1070, and input means including a keyboard and a mouse adapter and the like 1100. To the I/O controller 1070, the storage means including a flexible disk (FD) drive 1072, a hard disk 1074, an optical disk drive 1076 and a semiconductor memory 1078 can be connected. An amplification circuit 1032 and a speaker 1034 are connected to the audio processor 1030. A display 1022 is connected to the graphics controller 1020.

The BIOS 1060 stores a boot program that the CPU 1010 executes at the time of the boot-up of the information processor 100, a program dependent on the hardware of the information processor 100. The FD drive 1072 reads a program or data from the flexible disk 1071, to provide it to the main memory 1050 or the hard disk 1074 through the I/O controller 1070.

As the optical disk drive 1076, for example, a DVD-ROM drive, a CD-ROM drive, a DVD-RAM drive and a CD-RAM drive can be employed. Note that an optical disk 1077 supported in the employed drive needs to be used. The optical disk drive 1076 can read a program or data from the optical disk 1077 to provide it to the main memory 1050 or the hard disk 1074 through the I/O controller 1070.

Each computer program to be provided to the information processor 100 is provided by a user in the form of being stored in a recording medium, such as the flexible disk 1071, the optical disk 1077 or a memory card. The provided computer program is read out from the recording medium through the I/O controller 1070, or is downloaded through the communication I/F 1040, and thereby is installed in and executed by the information processor 100. The operations that the computer program causes the information processor 100 to perform are the same as those in the aforementioned devices, and accordingly the description thereof will be omitted.

The above computer programs can be stored in an external recording medium. The recording medium used here can be the flexible disk 1071, the optical disk 1077 or a memory card, or can alternatively be a magneto-optical recording medium such as an MD or a tape medium. Furthermore, the recording medium used here can be a storage device, such as a hard disk or an optical disk library, which is provided in a server system connected to a dedicated communication network or the Internet. In this case, the computer program can be provided to the information processor 100 through a communication network.

The above description has been given mainly of the hardware configuration example of the information processor 100. However, it is possible to implement the functionality similar to that of the aforementioned information processor by installing, onto a computer, a program providing the functionality described as that of the information processor, and thus causing the computer to operate as the information processor. Accordingly, the information processor described as an embodiment of the present invention can alternatively be implemented by a method or a computer program thereof.

Each device of the present invention can be implemented as hardware, software, or a combination of hardware and software. A typical example of such implementation as a combination of hardware and software is a computer system including a predetermined program. In such a case, by being loaded and executed on the computer system, the predetermined program causes the computer system to perform processing according an embodiment of the present invention.

The program is composed of a group of instructions which can be written in any language, codes, or notations. Such a group of instructions allow the system to directly execute specific functions, or to execute the specific functions after (1) the instructions are converted into different language, codes or notations, and/or (2) the instructions are copied to a different medium.

The scope of the present invention includes not only such a program itself, but also program products, such as a medium storing the program therein. The program for executing the functions of the present invention can be stored in any computer readable medium, such as a flexible disk, an MO, a CD-ROM, a DVD, a hard disk device, a ROM, an MRAM, and a RAM. Specifically, this program can be stored in the computer readable medium by being downloaded to the medium in a computer system from another computer system connected thereto through a communication line, or by being copied from a different medium.

The program can either be compressed and, thereafter stored in a single recording medium or be divided into pieces and stored in multiple recording media.

Although the present invention has been described by use of the embodiment, the invention is not limited to these embodiments. The effects described in the embodiment of the present invention are merely a list of the most preferable effects provided by the present invention, and the effects of the present invention are not limited to those described in the embodiment or the examples of the present invention.

The invention claimed is:

1. A dialog server comprising:
   at least one processor;
   a memory, coupled to said at least one processor;
   a persistent storage device, accessible to said memory and said at least one processor;
   a position storage module, stored in a non-transitory manner in said persistent storage device, which, when loaded into said memory causes said at least one processor to store, in at least one of said memory and said persistent storage device, positional information on at least a first avatar and a second avatar;
   an utterance receiver module, stored in a non-transitory manner in said persistent storage device, which, when loaded into said memory causes said at least one processor to receive (i) at least one utterance from said first avatar, and (ii) at least one utterance strength representing an importance or attention level of said at least one utterance;
   an interest level calculator module, stored in a non-transitory manner in said persistent storage device, which, when loaded into said memory causes said at least one processor to calculate at least one interest level between said first avatar and said second avatar, based on said positional information;

a message processor module, stored in a non-transitory manner in said persistent storage device, which, when loaded into said memory causes said at least one processor to generate a message from said at least one utterance in accordance with a value calculated from said at least one interest level and said at least one utterance strength; and a message transmitter module, stored in a non-transitory manner in said persistent storage device, which, when loaded into said memory causes said at least one processor to transmit said message to said second avatar;

wherein said message processor module generates the message from said at least one utterance only when a value calculated from said at least one interest level and said at least one utterance strength is not less than a predetermined threshold value; and wherein said interest level calculator module calculates said at least one interest level by:

calculating cosine of an angle between a facing direction of said first avatar and a line connecting said first and second avatars;

dividing said cosine by a distance between said first and second avatars; and multiplying said cosine by a normalization factor which satisfies a requirement such that a sum of all interest levels between said first avatar and a number of avatars in a circle having a predetermined radius and centered about said first avatar is unity.

2. The dialog server according to claim 1, wherein:

said utterance receiver module receives sound data of the utterance of said first avatar and said at least one utterance strength of said at least one utterance; and said message transmitter module transmits said sound data of said at least one message to said second avatar.

3. The dialog server according to claim 1, wherein:

said utterance receiver module receives at least one text data of said at least one utterance of said first avatar, and said at least one utterance strength of said at least one utterance; and said message transmitter module transmits said at least one text data of said at least one message to said second avatar.

4. The dialog server according to claim 1, wherein said message processor module generates at least one text data of said at least one message from said at least one utterance such that said at least one text data is displayed in a form varying in accordance with a value calculated from said at least one interest level and said at least one utterance strength.

5. The dialog server according to claim 1, wherein said interest level calculator module calculates said at least one interest level from said positional information, such that said at least one interest level becomes higher as said first avatar and said second avatar become closer.

6. The dialog server according to claim 1, further comprising:

a position receiver module, stored in a non-transitory manner in said persistent storage device, which, when loaded into said memory causes said at least one processor to receive said positional information.

7. The dialog server according to claim 1, further comprising:

a position transmitter module, stored in a non-transitory manner in said persistent storage device, which, when loaded into said memory causes said at least one processor to transmit said positional information.

8. A method comprising the steps of:

storing positional information on at least a first avatar and a second avatar;

receiving (i) at least one utterance from said first avatar and (ii) at least one utterance strength representing an importance or attention level of said at least one utterance;

calculating at least one interest level between said first avatar and said second avatar based on said positional information;

generating at least one message from said at least one utterance in accordance with a value calculated from said at least one interest level and said at least one utterance strength; and transmitting said at least one message to said second avatar;

wherein, in said step of generating said at least one message, said message is generated from said at least one utterance only when a value calculated from said at least one interest level and said at least one utterance strength is not less than a predetermined threshold value; and wherein said step of calculating said at least one interest level comprises:

calculating cosine of an angle between a facing direction of said first avatar and a line connecting said first and second avatars;

dividing said cosine by a distance between said first and second avatars; and multiplying said cosine by a normalization factor which satisfies a requirement such that a sum of all interest levels between said first avatar and a number of avatars in a circle having a predetermined radius and centered about said first avatar is unity.

9. The method according to claim 8, wherein:

in the step of receiving said at least one utterance and said at least one utterance strength of the utterance, sound data of said at least one utterance, and said at least one utterance strength are received; and in the step of transmitting said at least one message, sound data of said at least one message is transmitted to said second avatar.

10. The method according to claim 8, wherein:

in the step of receiving said at least one utterance and said at least one utterance strength, text data of said at least one utterance, and said at least one utterance strength are received; and in the step of transmitting said at least one message, said text data of said at least one message is transmitted to said second avatar.

11. The method according to claim 8, wherein, in the step of generating said at least one message, text data of said at least one message is generated from said at least one utterance such that said text data is displayed in a form varying in accordance with a value calculated from said at least one interest level and said at least one utterance strength.

12. The method according to claim 8, wherein, in the step of calculating said at least one interest level, said at least one interest level is calculated from said positional information such that said at least one interest level becomes higher as said first avatar and said second avatar become closer.

13. The method according to claim 8, further comprising: receiving said positional information.

14. The method according to claim 8, further comprising: transmitting said positional information.

15. A computer readable article of manufacture comprising a tangible, computer-readable recordable storage medium tangibly embodying, in a non-transitory manner, computer readable instructions which cause at least one hardware processor to execute a method, said method comprising the steps of:

storing positional information on at least a first avatar and a second avatar;

receiving (i) at least one utterance from said first avatar and (ii) at least one utterance strength representing an importance or attention level of said at least one utterance;

calculating at least one interest level between said first avatar and said second avatar based on said positional information;

generating at least one message from said at least one utterance in accordance with a value calculated from said at least one interest level and said at least one utterance strength; and transmitting said at least one message to said second avatar;

wherein, in said step of generating said at least one message, said message is generated from said at least one utterance only when a value calculated from said at least one interest level and said at least one utterance strength is not less than a predetermined threshold value; and wherein said computer readable instructions further comprise computer readable instructions which cause said at least one hardware processor to calculate said at least one interest level by:

calculating cosine of an angle between a facing direction of said first avatar and a line connecting said first and second avatars;

dividing said cosine by a distance between said first and second avatars; and multiplying said cosine by a normalization factor which satisfies a requirement such that a sum of all interest levels between said first avatar and a number of avatars in a circle having a predetermined radius and centered about said first avatar is unity.

16. The article of manufacture according to claim 15, wherein said computer readable instructions further comprise computer readable instructions which cause said at least one hardware processor to execute at least one of:

receiving said positional information; and
 transmitting said positional information.

17. The dialog server of claim 4, wherein said varying of said form comprises increasing a font size of said at least one text data in a first case, as compared to a second case, when said calculated value is greater in said first case than in said second case.

18. A dialog server comprising:
 at least one processor;
 a memory, coupled to said at least one processor;
 a persistent storage device, accessible to said memory and said at least one processor;
 a position storage module, stored in a non-transitory manner in said persistent storage device, which, when loaded into said memory causes said at least one processor to store, in at least one of said memory and said persistent storage device, positional information on at least a first avatar and a second avatar;
 an utterance receiver module, stored in a non-transitory manner in said persistent storage device, which, when loaded into said memory causes said at least one processor to receive (i) at least one utterance from said first avatar, and (ii) at least one utterance strength representing an importance or attention level of said at least one utterance;
 an interest level calculator module, stored in a non-transitory manner in said persistent storage device, which, when loaded into said memory causes said at least one processor to calculate at least one interest level between said first avatar and said second avatar, based on said positional information;
 a message processor module, stored in a non-transitory manner in said persistent storage device, which, when loaded into said memory causes said at least one processor to generate a message from said at least one utterance in accordance with a value calculated from said at least one interest level and said at least one utterance strength; and
 a message transmitter module, stored in a non-transitory manner in said persistent storage device, which, when loaded into said memory causes said at least one processor to transmit said message to said second avatar;
 wherein said message processor module generates the message from said at least one utterance only when a value calculated from said at least one interest level and said at least one utterance strength is not less than a predetermined threshold value; and
 wherein:
 said interest level calculator module calculates said at least one interest level, said at least one interest level being between said first avatar and said second avatar, by:
  calculating a first cosine, said first cosine being a cosine of an angle between a facing direction of said first avatar and a line connecting said first and second avatars;
  dividing said first cosine by a distance between said first and second avatars; and
  multiplying said first cosine by a first normalization factor which satisfies a requirement such that a sum of all interest levels between said first avatar and a number of avatars in a circle having a predetermined radius and centered about said first avatar is unity;
 said interest level calculator module calculates another interest level, said another interest level being between said second avatar and said first avatar, by:
  calculating a second cosine, said second cosine being a cosine of an angle between a facing direction of said second avatar and said line connecting said first and second avatars;
  dividing said second cosine by said distance between said first and second avatars; and
  multiplying said second cosine by a second normalization factor which satisfies a requirement such that a sum of all interest levels between said second avatar and a number of avatars in a circle having a predetermined radius and centered about said second avatar is unity; and
 said message processor module calculates said value from said at least one interest level and said at least one utterance strength by:
  multiplying said at least one interest level by a voice volume of said utterance and adding to a result thereof said another interest level.

19. The method of claim 11, wherein said varying of said form comprises increasing a font size of said at least one text data in a first case, as compared to a second case, when said calculated value is greater in said first case than in said second case.

20. A method comprising the steps of:
 storing positional information on at least a first avatar and a second avatar;

receiving (i) at least one utterance from said first avatar and (ii) at least one utterance strength representing an importance or attention level of said at least one utterance;

calculating at least one interest level between said first avatar and said second avatar based on said positional information;

generating at least one message from said at least one utterance in accordance with a value calculated from said at least one interest level and said at least one utterance strength; and transmitting said at least one message to said second avatar;

wherein, in said step of generating said at least one message, said message is generated from said at least one utterance only when a value calculated from said at least one interest level and said at least one utterance strength is not less than a predetermined threshold value;

further comprising calculating said value from said at least one interest level and said at least one utterance strength by:

calculating said at least one interest level, said at least one interest level being between said first avatar and said second avatar, by:

calculating a first cosine, said first cosine being a cosine of an angle between a facing direction of said first avatar and a line connecting said first and second avatars;

dividing said first cosine by a distance between said first and second avatars; and multiplying said first cosine by a first normalization factor which satisfies a requirement such that a sum of all interest levels between said first avatar and a number of avatars in a circle having a predetermined radius and centered about said first avatar is unity;

calculating another interest level, said another interest level being between said second avatar and said first avatar, by:

calculating a second cosine, said second cosine being a cosine of an angle between a facing direction of said second avatar and said line connecting said first and second avatars;

dividing said second cosine by said distance between said first and second avatars; and multiplying said second cosine by a second normalization factor which satisfies a requirement such that a sum of all interest levels between said second avatar and a number of avatars in a circle having a predetermined radius and centered about said second avatar is unity; and multiplying said at least one interest level by a voice volume of said utterance and adding to a result thereof said another interest level.

21. A computer readable article of manufacture comprising a tangible, computer-readable recordable storage medium tangibly embodying, in a non-transitory manner, computer readable instructions which cause at least one hardware processor to execute a method, said method comprising the steps of:

storing positional information on at least a first avatar and a second avatar;

receiving (i) at least one utterance from said first avatar and (ii) at least one utterance strength representing an importance or attention level of said at least one utterance;

calculating at least one interest level between said first avatar and said second avatar based on said positional information;

generating at least one message from said at least one utterance in accordance with a value calculated from said at least one interest level and said at least one utterance strength; and transmitting said at least one message to said second avatar;

wherein, in said step of generating said at least one message, said message is generated from said at least one utterance only when a value calculated from said at least one interest level and said at least one utterance strength is not less than a predetermined threshold value; and wherein said computer readable instructions further comprise computer readable instructions which cause said at least one hardware processor to calculate said value from said at least one interest level and said at least one utterance strength by:

calculating said at least one interest level, said at least one interest level being between said first avatar and said second avatar, by:

calculating a first cosine, said first cosine being a cosine of an angle between a facing direction of said first avatar and a line connecting said first and second avatars;

dividing said first cosine by a distance between said first and second avatars; and multiplying said first cosine by a first normalization factor which satisfies a requirement such that a sum of all interest levels between said first avatar and a number of avatars in a circle having a predetermined radius and centered about said first avatar is unity;

calculating another interest level, said another interest level being between said second avatar and said first avatar, by:

calculating a second cosine, said second cosine being a cosine of an angle between a facing direction of said second avatar and said line connecting said first and second avatars;

dividing said second cosine by said distance between said first and second avatars; and multiplying said second cosine by a second normalization factor which satisfies a requirement such that a sum of all interest levels between said second avatar and a number of avatars in a circle having a predetermined radius and centered about said second avatar is unity; and multiplying said at least one interest level by a voice volume of said utterance and adding to a result thereof said another interest level.

22. The dialog server of claim 1, wherein said at least one processor is further operative to:

afford a user associated with said second avatar an opportunity to obtain the message from said at least one utterance when said value calculated from said at least one interest level and said at least one utterance strength is subsequently at least equal to said predetermined threshold value.

23. The method of claim 8, further comprising the additional step of:

affording a user associated with said second avatar an opportunity to obtain the message from said at least one utterance when said value calculated from said at least one interest level and said at least one utterance strength is subsequently at least equal to said predetermined threshold value.

24. The article of manufacture according to claim 15, wherein said computer readable instructions further comprise computer readable instructions which cause said at least one hardware processor to:

afford a user associated with said second avatar an opportunity to obtain the message from said at least one utterance when said value calculated from said at least one interest level and said at least one utterance strength is subsequently at least equal to said predetermined threshold value.

* * * * *